United States Patent
DiPerna

(10) Patent No.: US 8,056,582 B2
(45) Date of Patent: Nov. 15, 2011

(54) SYSTEM OF STEPPED FLOW RATE REGULATION USING COMPRESSIBLE MEMBERS

(75) Inventor: Paul Mario DiPerna, San Clemente, CA (US)

(73) Assignee: Tandem Diabetes Care, Inc., San Diego, CA (US)

( * ) Notice: Subject to any disclaimer, the term of this patent is extended or adjusted under 35 U.S.C. 154(b) by 0 days.

(21) Appl. No.: 12/189,064

(22) Filed: Aug. 8, 2008

(65) Prior Publication Data

US 2010/0032041 A1 Feb. 11, 2010

(51) Int. Cl.
*F16L 55/04* (2006.01)
(52) U.S. Cl. ............... 138/30; 138/45; 138/46
(58) Field of Classification Search ............ 138/30, 138/45, 46
See application file for complete search history.

(56) References Cited

U.S. PATENT DOCUMENTS

| | | | | |
|---|---|---|---|---|
| 2,495,693 | A | * | 1/1950 | Byrd, Jr. et al. ............ 138/30 |
| 2,568,519 | A | * | 9/1951 | Smith .................... 138/45 |
| 2,701,583 | A | * | 2/1955 | Rux ..................... 138/26 |
| 2,735,642 | A | | 2/1956 | Norman |
| 3,017,903 | A | | 1/1962 | Eugene |
| 3,035,613 | A | * | 5/1962 | Beatty .................... 138/30 |
| 3,038,488 | A | | 6/1962 | Welch et al. |
| 3,061,039 | A | * | 10/1962 | Peters .................. 181/233 |
| 3,077,903 | A | * | 2/1963 | Honsinger ............. 138/45 |
| 3,493,496 | A | | 2/1970 | Bray et al. |
| 3,556,159 | A | * | 1/1971 | Bleasdale ............... 138/30 |
| 3,568,847 | A | | 3/1971 | Carr |
| 3,665,967 | A | * | 5/1972 | Kachnik ................ 138/137 |
| 3,675,672 | A | | 7/1972 | Freeman |
| 3,699,812 | A | | 10/1972 | Masnik |
| 3,717,174 | A | | 2/1973 | Dewall |
| 3,756,459 | A | | 9/1973 | Bannister et al. |
| 3,894,538 | A | | 7/1975 | Richter |
| 3,970,105 | A | * | 7/1976 | Pelton et al. ............ 137/498 |
| 4,105,050 | A | | 8/1978 | Hendrickson et al. |
| 4,178,938 | A | | 12/1979 | Au |
| 4,181,245 | A | | 1/1980 | Garrett et al. |
| 4,184,342 | A | | 1/1980 | Pohl |
| 4,228,956 | A | * | 10/1980 | Varner ................ 239/237 |

(Continued)

FOREIGN PATENT DOCUMENTS

JP 2952037 9/1999

(Continued)

OTHER PUBLICATIONS

International Search Report and Written Opinion mailed on Sep. 10, 2004 in International Application: PCT/US2003/022703 filed on Jul. 15, 2003 and published as: WO 04/009152 on Jan. 29, 2004.

(Continued)

*Primary Examiner* — James Hook
(74) *Attorney, Agent, or Firm* — Grant Anderson LLP

(57) ABSTRACT

A series of compressible members disposed with a vessel lumen designed to produce a flow rate that increases with respect to an increasing flow material pressure with the rate of increase having a stepped behavior. The first compressible member is designed so as to partially restrict flow so as to allow for only moderate increases in flow rate with respect to flow material pressure. Subsequent compressible members are designed to allow for increases in flow rate greater than the moderate rate of increase when the flow material pressure is above a given flow material pressure.

12 Claims, 2 Drawing Sheets

U.S. PATENT DOCUMENTS

| | | |
|---|---|---|
| 4,250,872 A | 2/1981 | Tamari |
| 4,254,791 A | 3/1981 | Bron |
| 4,265,241 A | 5/1981 | Portner et al. |
| 4,314,621 A * | 2/1982 | Hansen .......................... 181/233 |
| 4,382,453 A | 5/1983 | Bujan et al. |
| 4,432,468 A | 2/1984 | Siff et al. |
| 4,443,218 A | 4/1984 | DeCant, Jr. et al. |
| 4,457,343 A * | 7/1984 | Zukausky ........................ 138/45 |
| 4,515,536 A | 5/1985 | van Os |
| 4,557,726 A | 12/1985 | Reinicke |
| 4,609,014 A * | 9/1986 | Jurjevic et al. ................... 138/45 |
| 4,636,226 A | 1/1987 | Canfora |
| 4,651,781 A * | 3/1987 | Kandelman ..................... 138/30 |
| 4,666,430 A | 5/1987 | Brown et al. |
| 4,667,700 A * | 5/1987 | Buzzi .............................. 138/45 |
| 4,673,415 A | 6/1987 | Stanford |
| 4,684,364 A | 8/1987 | Sawyer et al. |
| 4,684,367 A | 8/1987 | Schaffer et al. |
| 4,718,893 A | 1/1988 | Dorman et al. |
| 4,778,451 A | 10/1988 | Kamen |
| 4,787,408 A | 11/1988 | Twerdochlib |
| 4,826,482 A | 5/1989 | Kamen |
| 4,840,191 A | 6/1989 | Gausman et al. |
| 4,938,259 A * | 7/1990 | Schmidt ........................... 138/45 |
| 4,955,860 A | 9/1990 | Ruano |
| 4,969,884 A | 11/1990 | Yum |
| 4,973,402 A | 11/1990 | Johnson et al. |
| 4,976,162 A | 12/1990 | Kamen |
| 5,053,189 A | 10/1991 | Chrise et al. |
| 5,059,182 A | 10/1991 | Laing |
| 5,084,021 A | 1/1992 | Baldwin |
| 5,090,963 A | 2/1992 | Gross et al. |
| 5,135,491 A | 8/1992 | Baldwin |
| 5,154,712 A | 10/1992 | Herweek et al. |
| 5,158,230 A | 10/1992 | Curran |
| 5,186,431 A | 2/1993 | Tamari |
| 5,207,645 A | 5/1993 | Ross et al. |
| 5,240,031 A | 8/1993 | Vigil |
| 5,240,603 A | 8/1993 | Frank et al. |
| 5,316,261 A | 5/1994 | Stoner |
| 5,322,626 A | 6/1994 | Frank et al. |
| 5,326,468 A | 7/1994 | Cox |
| 5,342,305 A | 8/1994 | Shonk |
| 5,354,273 A | 10/1994 | Hagen |
| 5,356,375 A | 10/1994 | Higley |
| 5,399,166 A | 3/1995 | Laing |
| 5,421,208 A | 6/1995 | Packard et al. |
| 5,429,601 A | 7/1995 | Conley et al. |
| 5,476,449 A | 12/1995 | Richmond |
| 5,492,534 A | 2/1996 | Athayde et al. |
| 5,527,288 A | 6/1996 | Gross et al. |
| 5,545,252 A | 8/1996 | Hinshaw et al. |
| RE35,501 E | 5/1997 | Ross et al. |
| 5,694,961 A * | 12/1997 | Begemann et al. ................ 137/2 |
| 5,704,520 A | 1/1998 | Gross |
| 5,785,688 A | 7/1998 | Joshi et al. |
| 5,860,957 A | 1/1999 | Jacobsen et al. |
| 5,878,992 A | 3/1999 | Edwards et al. |
| 5,938,636 A | 8/1999 | Kramer et al. |
| 5,997,501 A | 12/1999 | Gross et al. |
| 6,012,492 A * | 1/2000 | Kozyuk ........................... 138/37 |
| 6,033,393 A | 3/2000 | Balbierz et al. |
| 6,039,078 A * | 3/2000 | Tamari ............................. 138/30 |
| 6,074,374 A | 6/2000 | Fultin |
| 6,093,312 A | 7/2000 | Boulter |
| 6,165,155 A | 12/2000 | Jacobsen et al. |
| 6,178,996 B1 | 1/2001 | Suzuki |
| 6,186,982 B1 | 2/2001 | Gross et al. |
| 6,213,120 B1 | 4/2001 | Block et al. |
| 6,254,355 B1 | 7/2001 | Gharib |
| 6,280,408 B1 | 8/2001 | Sipin |
| 6,398,760 B1 | 6/2002 | Danby |
| 6,413,238 B1 | 7/2002 | Maget |
| 6,422,256 B1 | 7/2002 | Balazy et al. |
| 6,458,102 B1 | 10/2002 | Mann et al. |
| 6,571,831 B1 | 6/2003 | Hart |
| 6,712,095 B2 | 3/2004 | Williamson et al. |
| 6,732,573 B2 | 5/2004 | Shin et al. |
| 6,743,201 B1 | 6/2004 | Doing et al. |
| 6,847,898 B1 | 1/2005 | Chen et al. |
| 6,892,755 B2 | 5/2005 | Black |
| 7,008,403 B1 | 3/2006 | Mallett |
| 7,341,581 B2 | 3/2008 | Mallett |
| 7,374,556 B2 | 5/2008 | Mallett |
| 7,559,223 B2 | 7/2009 | Chen et al. |
| 2002/0045265 A1 | 4/2002 | Bergh et al. |
| 2002/0048536 A1 | 4/2002 | Bergh et al. |
| 2002/0055787 A1 | 5/2002 | Lennox et al. |
| 2002/0059959 A1 * | 5/2002 | Qatu et al. ...................... 138/30 |
| 2002/0117214 A1 | 8/2002 | Tucker et al. |
| 2002/0120234 A1 | 8/2002 | Kong |
| 2003/0130577 A1 | 7/2003 | Purdy et al. |
| 2003/0216683 A1 | 11/2003 | Shekalim |
| 2004/0116905 A1 | 6/2004 | Pedersen et al. |
| 2004/0133220 A1 | 7/2004 | Lashinski et al. |
| 2004/0171987 A1 | 9/2004 | Bridle et al. |
| 2005/0054994 A1 | 3/2005 | Cioanta et al. |
| 2005/0171529 A1 | 8/2005 | Girard et al. |
| 2005/0245867 A1 | 11/2005 | Olsen et al. |
| 2006/0042695 A1 | 3/2006 | Gonia |
| 2006/0150747 A1 | 7/2006 | Mallett |
| 2006/0206029 A1 | 9/2006 | Yair |
| 2007/0100235 A1 | 5/2007 | Kennedy, II |
| 2007/0219496 A1 | 9/2007 | Kamen |
| 2008/0029173 A1 | 2/2008 | DiPerna |
| 2008/0082040 A1 | 4/2008 | Kubler et al. |
| 2008/0092969 A1 | 4/2008 | DiPerna et al. |
| 2008/0196762 A1 | 8/2008 | Mallett et al. |
| 2009/0191067 A1 | 7/2009 | Diperna |
| 2009/0217982 A1 | 9/2009 | Diperna |
| 2010/0008795 A1 | 1/2010 | Diperna |
| 2010/0096019 A1 | 4/2010 | Diperna |

FOREIGN PATENT DOCUMENTS

| | | |
|---|---|---|
| JP | 2002-143293 | 5/2002 |
| JP | 2006-101985 | 4/2009 |
| KR | 10-2001-0080519 | 8/2001 |
| WO | WO 90/13795 | 11/1990 |
| WO | WO 94/26329 | 11/1994 |
| WO | WO 98/57683 | 12/1998 |
| WO | WO 00/72900 | 12/2000 |
| WO | WO 01/30422 | 5/2001 |
| WO | WO 02/11791 | 2/2002 |
| WO | WO 02/26102 | 4/2002 |
| WO | WO 06/108219 | 10/2006 |
| WO | WO 07/089983 | 8/2007 |
| WO | WO 08/121599 | 10/2008 |
| WO | WO 09/094590 | 7/2009 |
| WO | WO 09/108639 | 9/2009 |
| WO | WO 10/016977 | 2/2010 |
| WO | WO 10/016978 | 2/2010 |
| WO | WO 11/014704 | 2/2011 |
| WO | WO 11/017667 | 2/2011 |

OTHER PUBLICATIONS

International Search Report and Written Opinion mailed on: Jul. 23, 2007 in International Application: PCT/2007/060633 filed on: Jan. 17, 2007 and published as: WO 07/089983 on: Aug. 9, 2007.

International Preliminary Report on Patentability mailed on: Jul. 29, 2008 in International Application: PCT/2007/060633 filed on: Jan. 17, 2007 and published as: WO 07/089983 on: Aug. 9, 2007.

Written Opinion of the International Searching Authority of Aug. 11, 2008 in International Application: PCT/US2008/058044 filed on: Mar. 24, 2008 and published as: WO 08/121599 on: Oct. 9, 2009.

International Preliminary Report on Patentability mailed on: Oct. 6, 2009 in International Application: PCT/2008/058044 filed on: Mar. 24, 2008 and published as: WO 08/121599 on: Oct. 9, 2009.

International Search Report and Written Opinion mailed on: May 29, 2009 in International Application: PCT/US2009/035022 filed on: Jan. 23, 2009 and published as: WO 09/108639 on: Sep. 3, 2009.

International Preliminary Report on Patentability mailed on: Sep. 10, 2010 in International Application: PCT/US2009/035022 filed on: Jan. 23, 2009 and published as: WO 09/108639 on: Sep. 3, 2009.

International Search Report and Written Opinion mailed on: Feb. 17, 2011 in International Application: PCT/US2009/049110 filed on: Jun. 29, 2009 and published as: WO 10/016977 on: Feb. 11, 2010.
International Search Report and Written Opinion mailed on: Jan. 27, 2010 in International Application: PCT/US2009/049110 filed on: Jun. 29, 2009 and published as: WO 10/016977 on: Feb. 11, 2010.
International Search Report and Written Opinion mailed on: Feb. 17, 2011 in International Application: PCT/2009/049166 filed on: Jun. 29, 2009 and published as: WO 10/016978 on: Feb. 11, 2010.
International Search Report and Written Opinion mailed on: Feb. 4, 2010 in International Application: PCT/2009/049166 filed on: Jun. 29, 2009 and published as: WO 10/016978 on: Feb. 11, 2010.
International Preliminary Report on Patentability mailed on Aug. 5, 2010 in International Application: PCT/US2009/031906 filed on Jan. 23, 2009 and published as: WO 09/094590 on Jul. 30, 2009.
International Search Report and Written Opinion mailed on Jul. 28, 2009 in International Application: PCT/US2009/031906 filed on Jan. 23, 2009 and published as: WO 09/094590 on Jul. 30, 2009.
International Search Report and Written Opinion mailed on: Jan. 4, 2010 in International Application: PCT/US2009/044569 filed on: May 19, 2009 and published as: WO 09/143188 on: Nov. 26, 2009.
International Preliminary Report on Patentability mailed: Dec. 2, 2010, in International Patent Application No. PCT/US2009/044569 filed on: May 19, 2009 and published as WO 2009/143188 on: Nov. 26, 2009.
International Preliminary Report on Patentability mailed on Mar. 31, 2011 in International Application: PCT/2009/57208 filed on: Sep. 16, 2009 and published as: WO 10/033634 on: Mar. 25, 2010.
International Search Report and Written Opinion mailed on Apr. 1, 2010 in International Application: PCT/2009/057208 filed on: Sep. 16, 2009 and published as: WO 10/033634 on: Mar. 25, 2010.
International Search Report and Written Opinion mailed on: Sep. 30, 2010 in International Application: PCT/2010/025663 filed on: Feb. 26, 2010 and published as: WO 10/099490 on: Sep. 2, 2010.
International Preliminary Report on Patentability mailed on Mar. 31, 2011 in International Application: PCT/2009/57591 filed on: Sep. 18, 2009 and published as: WO 10/033878 on: Mar. 25, 2010.
International Search Report and Written Opinion mailed on Apr. 12, 2010 in International Application: PCT/2009/57591 filed on: Sep. 18, 2009 and published as: WO 10/033878 on: Mar. 25, 2010.
International Search Report and Written Opinion mailed on Apr. 11, 2011 in International Application: PCT/2010/043789 filed on: Jul. 29, 2010 and published as: WO 11/014704 on: Feb. 3, 2011.
Office Action mailed on: Jul. 18, 2011 in U.S. Appl. No. 12/108,462 filed on: Apr. 23, 2008 and published as: US-2008-0196762 on: Aug. 21, 2008.
Office Action mailed on: Mar. 21, 2011 in U.S. Appl. No. 12/108,462 filed on: Apr. 23, 2008 and published as: US-2008-0196762 on: Aug. 21, 2008.
Office Action mailed on: Oct. 6, 2010 in U.S. Appl. No. 12/108,462 filed on: Apr. 23, 2008 and published as: US-2008-0196762 on: Aug. 21, 2008.
Office Action mailed on: Apr. 1, 2011 in U.S. Appl. No. 11/462,962 filed on: Aug. 7, 2006 and published as: US2008/0092969 on Apr. 24, 2008.
Office Action mailed on: Sep. 16, 2010 in U.S. Appl. No. 11/462,962 filed on: Aug. 7, 2006 and published as: US2008/0092969 on Apr. 24, 2008.
Office Action mailed on: Nov. 24, 2009 in U.S. Appl. No. 11/462,962 filed on: Aug. 7, 2006 and published as: US2008/0092969 on Apr. 24, 2008.
Office Action mailed on: May 5, 2011 in U.S. Appl. No. 11/694,841 filed on: Mar. 30, 2007 and published as: US2008/0029173 on Feb. 7, 2008.
Office Action mailed on: Jul. 21, 2010 in U.S. Appl. No. 11/694,841 filed on: Mar. 30, 2007 and published as: US2008/0029173 on Feb. 7, 2008.
Office Action mailed on: Oct. 30, 2009 in U.S. Appl. No. 11/694,841 filed on: Mar. 30, 2007 and published as: US2008/0029173 on Feb. 7, 2008.
Office Action mailed on: Jun. 24, 2009 in U.S. Appl. No. 11/694,841 filed on: Mar. 30, 2007 and published as: US2008/0029173 on Feb. 7, 2008.
Office Action mailed on: May 1, 2009 in U.S. Appl. No. 11/694,841 filed on: Mar. 30, 2007 and published as: US2008/0029173 on Feb. 7, 2008.
Office Action mailed on: May 5, 2011, in U.S. Appl. No. 12/039,693 filed on: Feb. 28, 2008 and published as: US2009/0217982 on Sep. 3, 2009.
Office Action mailed on: Mar. 17, 2010, in U.S. Appl. No. 12/039,693 filed on: Feb. 28, 2008 and published as: US2009/0217982 on Sep. 3, 2009.
Office Action mailed on: May 3, 2010 in U.S. Appl. No. 12/189,070 filed on: Aug. 8, 2008 and published as: US2010/0036327 on Feb. 11, 2010.
Office Action mailed on: Jan. 19, 2011 in U.S. Appl. No. 12/189,070 filed on: Aug. 8, 2008 and published as: US2010/0036327 on Feb. 11, 2010.
Office Action mailed on: Mar. 3, 2011, in U.S. Appl. No. 12/020,498 filed on: Jan. 25, 2008 and published as: US2009/0191067 on Jul. 20, 2009.

* cited by examiner

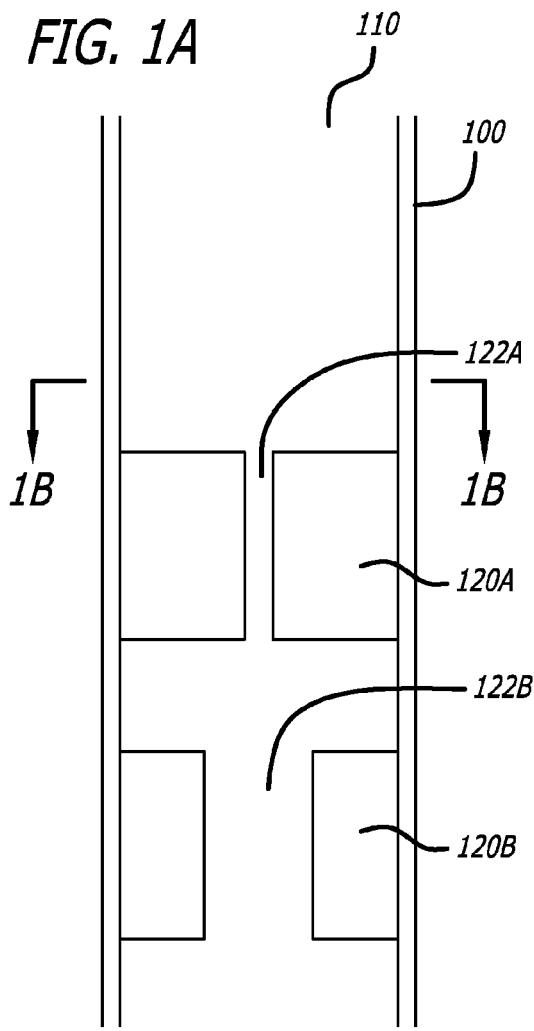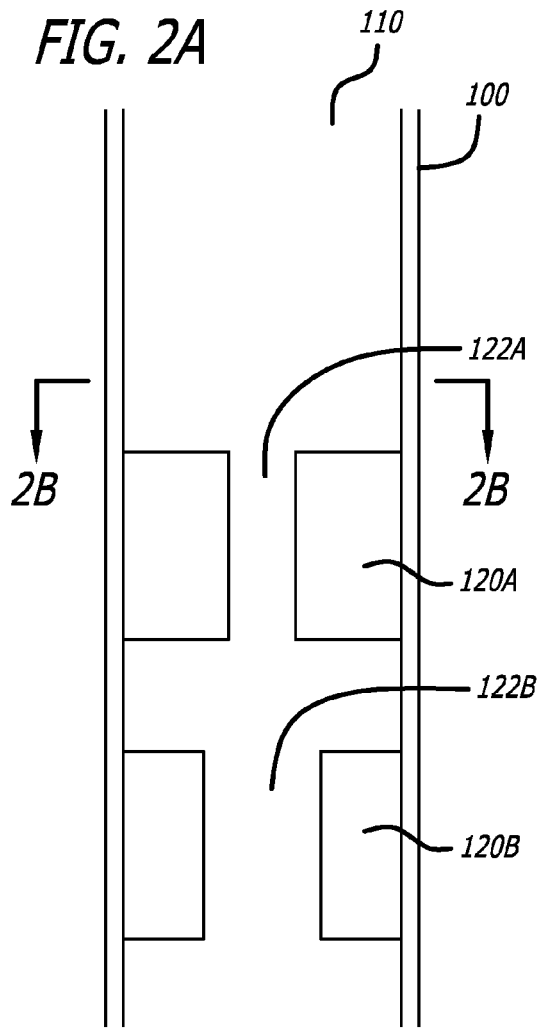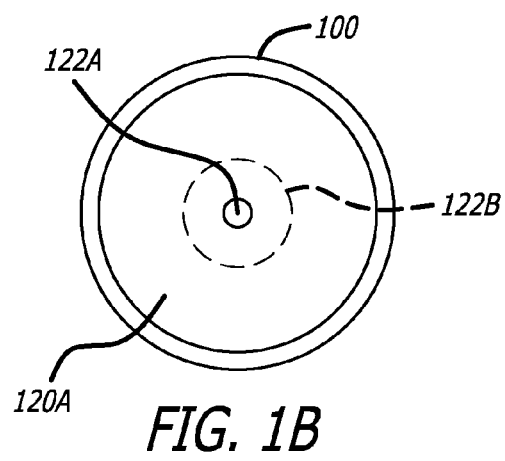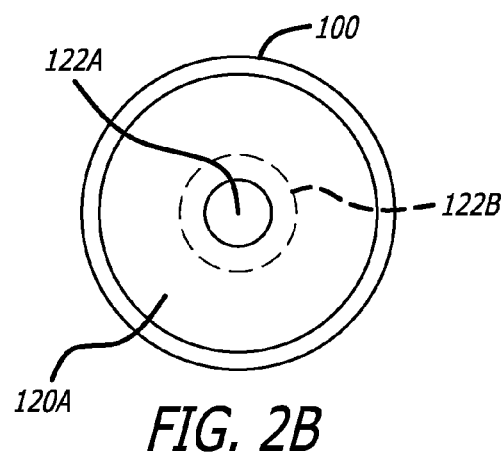

SYSTEM OF STEPPED FLOW RATE REGULATION USING COMPRESSIBLE MEMBERS

BACKGROUND OF THE DISCLOSURE

This disclosure relates to flow regulators designed to ensure a predictable and stepped flow rate increase relative to a pressure increase through a conduit, tube, pipe, related luminal space defined by a passageway with a substantially open zone running through a central aspect.

SUMMARY OF THE DISCLOSURE

A series of compressible members disposed with a vessel lumen designed to produce a flow rate that increases with respect to an increasing flow material pressure with the rate of increase having a stepped behavior. The first compressible member is designed so as to partially restrict flow so as to allow for only moderate increases in flow rate with respect to flow material pressure. Subsequent compressible members are designed to allow for increases in flow rate greater than the moderate rate of increase when the flow material pressure is above a given flow material pressure.

According to a feature of the present disclosure, a flow regulation device is disclosed, comprising: a vessel lumen for transporting a flow material and a set of at least one compressible member disposed along the flow path of the flow material and configured to expand radially as the pressure of the flow material increases.

According to another feature of the present disclosure, a method is disclosed of regulating the flow of a flow material, comprising: providing a vessel having a lumen and a set of at least one compressible member disposed along the flow path of the flow material and configured to expand radially as the pressure of the flow material increases.

DRAWINGS OF THE DISCLOSURE

The above-mentioned features and objects of the present disclosure will become more apparent with reference to the following description taken in conjunction with the accompanying drawings wherein like reference numerals denote like elements and in which:

FIG. 1A is a side sectional view of embodiments of the device of the present disclosure disposed within a lumen with no or little flow material flowing through the lumen;

FIG. 1B is a top sectional view of embodiments of the device of the present disclosure taken generally along line 1B-1B with little or no flow material flowing through the lumen;

FIG. 2A is a side sectional view of embodiments of the device of the present disclosure disposed within a lumen with the flow material pressure in the slow flow regime;

FIG. 2B is a top sectional view of embodiments of the device of the present disclosure taken generally along line 2B-2B with the flow material pressure in the slow flow regime;

DETAILED DESCRIPTION OF THE DISCLOSURE

Figure 3A:
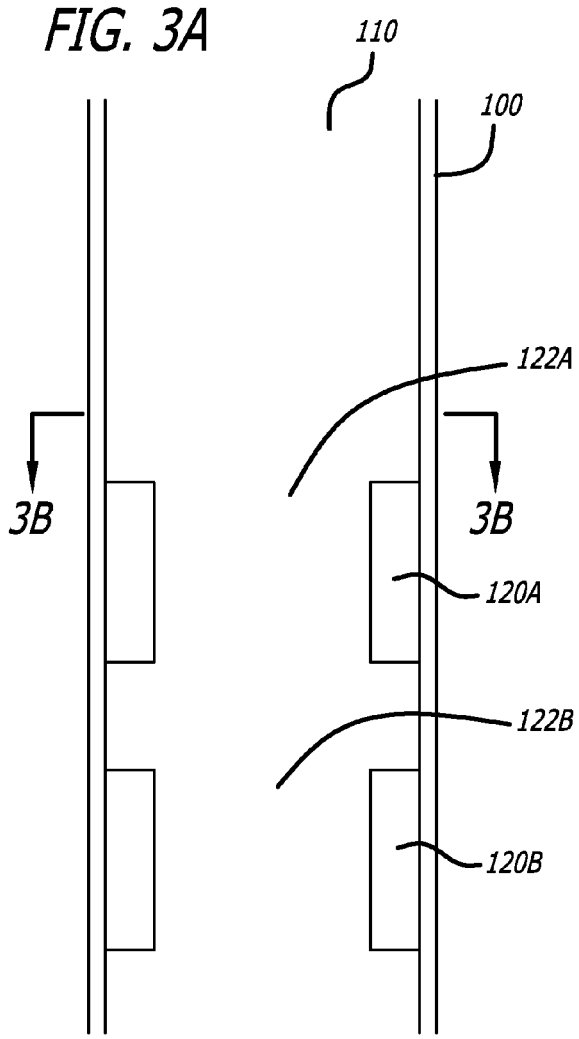
FIG. 3A is a side sectional view of embodiments of the device of the present disclosure disposed within a lumen with the flow material pressure in the fast flow regime.

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, biological, electrical, functional, and other changes may be made without departing from the scope of the present invention. The following detailed description is, therefore, not to be taken in a limiting sense, and the scope of the present invention is defined only by the appended claims. As used in the present disclosure, the term "or" shall be understood to be defined as a logical disjunction and shall not indicate an exclusive disjunction unless expressly indicated as such or notated as "xor."

As used in the present disclosure, the term "compress" or "compression" shall be defined as a decrease in volume of the compressible members of the present disclosure.

As used in the present disclosure, the term "expand" or "expansion" shall be defined as the increase in the interior diameter of the compressible members of the present disclosure.

Disclosed are compressible members to be used with a vessel lumen to control the rate at which a fluid flow increases with respect to the pressure of the fluid. The compressible members are used to control the rate at which the flow rate increases with respect to the flow material pressure. The compressible pieces further provide for any number of stepped rates of increase of flow rate with respect to flow material pressure. The compressible pieces are designed to create pressure regions wherein any increase in flow material pressure results in a linear increase in flow rate, each region having its own specific linear flow rate increase.

According to embodiments of the present disclosure and as shown in FIG. 1A, a flow regulation device is shown. Flow regulation device 100 comprises, according to embodiments, vessel lumen 110 which transports a flow material and contains a plurality of compressible members 120A and 120B. If desired, additional compressible members may be disposed with vessel lumen 110 either before or after compressible members 120A and 120B.

All compressible members 120A, 120B, etc. are composed of a compressible material such as an elastomer whereby they compress in response to an increase in flow material pressure of flow material in vessel lumen 110. As known and understood by artisans, each compressible member 120A, 120B, etc. may be made from the same or different elastomeric materials and have the same or different compression profiles, according to embodiments.

Also illustrated in FIG. 1A and FIG. 1B, according to embodiments, is the relative size difference between compressible members 120A and 120B. Compressible member 120A is designed to restrict flow to a greater extent than compressible member 120B. This is accomplished by designing compressible member 120A to include channel 122A with a smaller diameter than corresponding channel 122B. As illustrated in FIG. 1A and FIG. 1B, channel 122B has a larger diameter than channel 122A.

To utilize flow regulation device 100, a source of a flow material is secured to flow regulation device 100, generally on the end closest to compressible member 120A. Additionally, a destination for the flow material is secured to flow regulation device 100, generally on the end closest to compressible member 120B. With flow regulation device 100 installed, the flow material is allowed to flow through vessel lumen 110.

As illustrated in FIG. 2A and according to embodiments, the flow material pressure may be increased so as to put pressure on compressible member 120A. Increasing the pressure of the flow material causes compressible member 120A to compress. A compression of compressible member 120 results in an increased diameter of channel 122A, thus providing less resistance to the flow materials progression through flow regulation device 100.

As mentioned above, compressible member 120B is designed to give channel 122B a larger initial diameter than channel 122A, according to embodiments. For this reason and as illustrated in FIG. 2A and FIG. 2B the initial flow of flow material and accompanying pressure increase has little effect on compressible member 120B in comparison to compressible member 120A. Thus, as the increasing flow material pressure causes compressible member 120A to compress, compressible member 120B remains relatively unaffected.

As the flow material pressure increases further, a threshold pressure will be reached, the threshold pressure being the flow material pressure at which compressible member 120A has fully compressed and the diameter of channel 122A is at a maximum. At this threshold pressure, compressible member 120B begins to experience a compression resulting from any additional increase in flow material pressure. Because compressible member 120B remains the last compressible resistance to flow, increasing the flow material pressure causes channel 122B to increase in diameter.

Figure 3B:
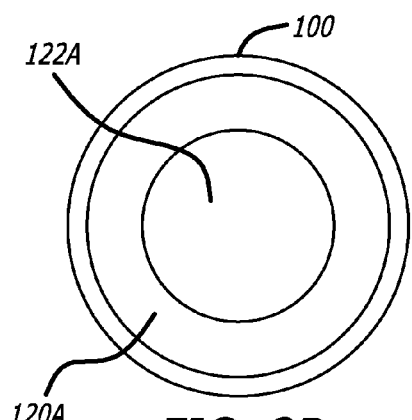
FIG. 3B is a top sectional view of embodiments of the device of the present disclosure taken generally along line 3B-3B with the flow material pressure in the fast flow regime.

FIG. 3A and FIG. 3B illustrate the result of a flow material pressure above the threshold pressure where compressible member 120A has fully compressed and compressible member 120B has compressed as well. Channels 122A and 122B have enlarged providing less resistance to the flow of flow material through flow regulation device 100.

Alternatively, compressible members 120A and 120B may be attached to an outer wall of vessel lumen 110. According to such embodiments, increasing flow material pressure results in an expansion of compressible members 120A and 120B, respectively.

Figure 4:
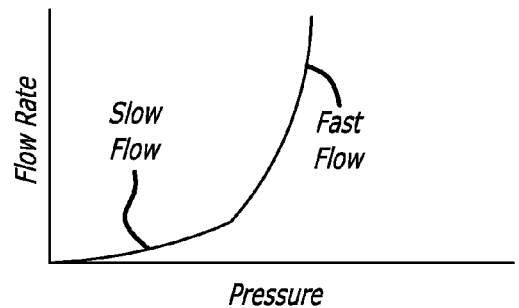
FIG. 4 is a graph of embodiments of the device of the present disclosure illustrating the behavior of the flow rate through the lumen with respect to flow material pressure.

FIG. 4 illustrates the flow material flow rate behavior with respect to the flow material pressure. As illustrated, the flow rate of flow material is divided into two general regimes, slow flow, and fast flow, each regime generally controlled by the compression of each successive compressible member contained in or on vessel lumen 110. Artisans will appreciate that the linearity illustrated in FIG. 4 is for illustration of the general principle only; in actual practice, the lines may be non-linear. The slow flow regime corresponds to a minimal or low flow material pressure below the threshold pressure, in which compressible member 120A greatly restricts the flow of flow material. Increasing the flow material pressure compresses compressible member 120A causing channel 122A to increase in diameter and allowing an increase in the flow rate. The fast flow regime corresponds to a flow material pressure above the threshold pressure, in which compressible member 120B becomes the only compressible member to compress in response to an increase in flow material pressure. Increasing the flow material pressure compresses compressible member 120B causing channel 122B to increase in diameter and resulting in a faster increase in the flow rate with respect to a corresponding increase in flow material pressure.

According to embodiments, a method is disclosed whereby the flow rate of flow material through vessel lumen 110 is affected. Flow regulation device 100 is connected to a flow material source and to a flow material destination. Flow regulation device 100 is positioned with compressible member 120A toward the flow material source and the flow material destination attached at the other end of flow regulation device 100. Flow material should flow from the flow material source and first contact compressible member 120A. With the connections established, flow material may flow from the flow material source to flow regulation device 100. When the flow material pressure is below the threshold pressure, compressible member 120A compresses in response to the pressure of the flow material. In this pressure regime, compressible member 120A tends to control the flow rate behavior of flow material by allowing only a modest increase in flow rate in response to an increase in flow material pressure. Increasing the flow material pressure above the threshold pressure fully compresses compressible member 120A. In this second pressure regime, compressible member 120B tends to control the flow rate behavior of flow material by allowing a more substantial increase in flow rate in response to an increase in flow material pressure.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

While the method and agent have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

It should also be understood that a variety of changes may be made without departing from the essence of the invention. Such changes are also implicitly included in the description. They still fall within the scope of this invention. It should be understood that this disclosure is intended to yield a patent covering numerous aspects of the invention both independently and as an overall system and in both method and apparatus modes.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these.

Particularly, it should be understood that as the disclosure relates to elements of the invention, the words for each element may be expressed by equivalent apparatus terms or method terms—even if only the function or result is the same.

Such equivalent, broader, or even more generic terms should be considered to be encompassed in the description of each element or action. Such terms can be substituted where desired to make explicit the implicitly broad coverage to which this invention is entitled.

It should be understood that all actions may be expressed as a means for taking that action or as an element which causes that action.

Similarly, each physical element disclosed should be understood to encompass a disclosure of the action which that physical element facilitates.

Any patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in at least one of a standard technical dictionary recognized by artisans and the Random House Webster's Unabridged Dictionary, latest edition are hereby incorporated by reference.

Finally, all referenced listed in the Information Disclosure Statement or other information statement filed with the application are hereby appended and hereby incorporated by reference; however, as to each of the above, to the extent that such information or statements incorporated by reference might be considered inconsistent with the patenting of this/these invention(s), such statements are expressly not to be considered as made by the applicant(s).

In this regard it should be understood that for practical reasons and so as to avoid adding potentially hundreds of claims, the applicant has presented claims with initial dependencies only.

Support should be understood to exist to the degree required under new matter laws—including but not limited to United States Patent Law 35 USC 132 or other such laws—to permit the addition of any of the various dependencies or other elements presented under one independent claim or concept as dependencies or elements under any other independent claim or concept.

To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps.

Such terms should be interpreted in their most expansive forms so as to afford the applicant the broadest coverage legally permissible.

The invention claimed is:

1. A device comprising:
   a vessel lumen for transporting a flow material in a flow direction; and
   a plurality of compressible members, each including an opening through which flow material flows, the compressible members being disposed along the vessel lumen for restricting the flow rate of a flow material flowing through the vessel lumen;
   wherein the opening of each compressible member along the flow direction has a larger total surface area than the total surface area of the at least one opening of the prior compressible members along the flow direction; and
   wherein the opening expands to a larger total surface area as a function of an increase of the flow material pressure.

2. The device of claim 1, wherein the opening of each compressible member is configured to expand radially as the pressure of the flow material increases.

3. The device of claim 1, wherein the opening of at least one of the plurality of the compressible members is configured to expand at a rate different from the at least one opening of at least one other compressible member.

4. The device of claim 1, wherein the opening of each subsequent compressible member along the flow direction does not substantially expand until the opening of the immediately previous compressible members has substantially expanded.

5. The device of claim 1, wherein each of the compressible members has a variable modulus of elasticity, whereby the opening of each of the compressible members is configured to expand as a function of pressure at different rates.

6. The device of claim 1, wherein the variable surface area of the opening of each compressible member comprises a single opening having a variable diameter from the opening of at least one other compressible member.

7. A method comprising:
   providing a vessel lumen for transporting a flow material in a flow direction; and
   providing a plurality of compressible members, each including an opening through which flow material flows, the compressible members being disposed along the vessel lumen for restricting the flow rate of a flow material flowing through the vessel lumen;
   wherein the opening of each compressible member along the flow direction includes a larger total surface area than the total surface area of the opening of the prior compressible members along the flow direction; and
   wherein the opening expands to a larger total surface area as a function of an increase of the flow material pressure.

8. The method of claim 7, wherein the opening of each compressible member is configured to expand radially as the pressure of the flow material increases.

9. The method of claim 7, wherein the opening of at least one of the compressible members is configured to expand at a rate different from the opening in at least one other compressible member.

10. The method of claim 7, wherein the opening of each subsequent compressible member along the flow direction does not substantially expand until the opening of the immediately previous compressible members has substantially expanded.

11. The method of claim 7, wherein each of the compressible members includes a variable modulus of elasticity, whereby the opening of each of the compressible members is configured to expand as a function of pressure at different rates.

12. The method of claim 7, wherein the variable surface area of the opening of each compressible member comprises a single opening including a variable diameter from the opening of at least one other compressible member.

* * * * *